No. 765,836. PATENTED JULY 26, 1904.
C. F. HETTINGER.
SEPARATOR AND CLEANER.
APPLICATION FILED MAR. 26, 1904.
NO MODEL. 2 SHEETS—SHEET 1.

Witnesses:
Hermann W. Bormann
Sophie Bormann.

Inventor:
Carl F. Hettinger
By Hermann Bormann
Att'y.

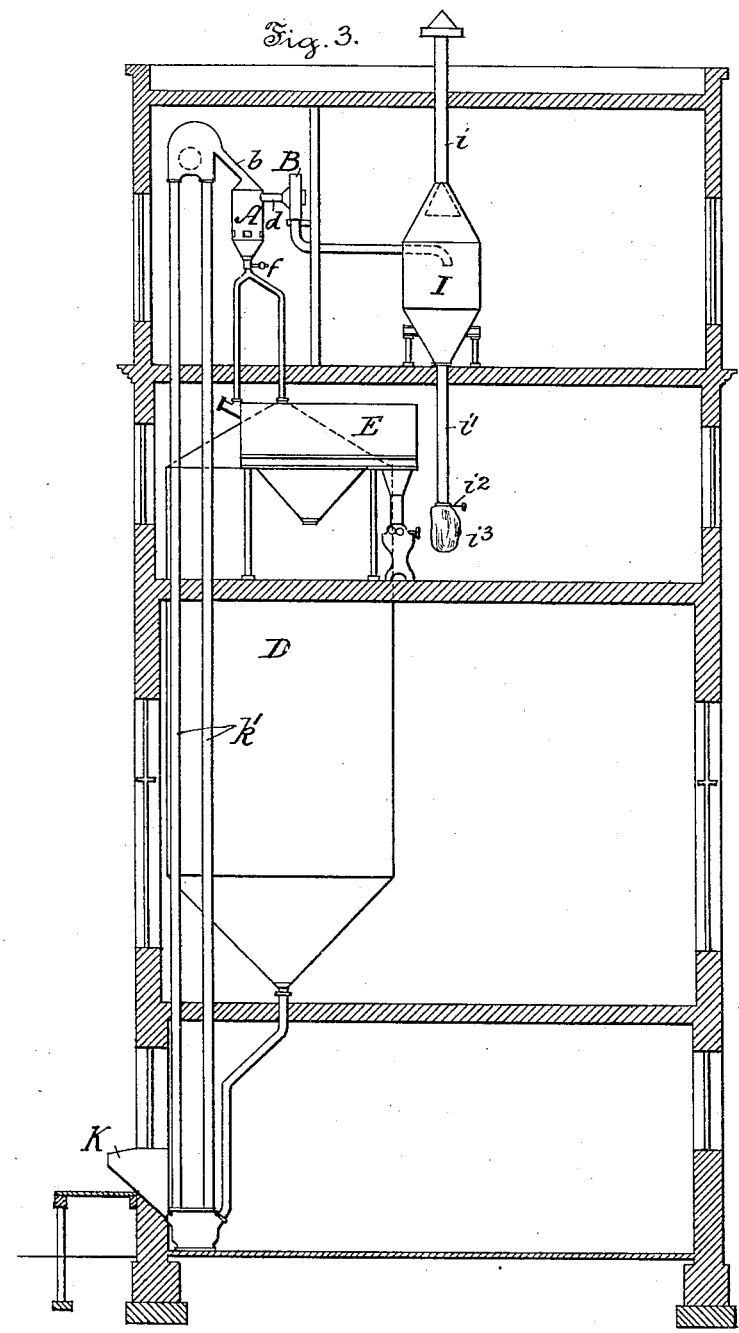

No. 765,836. Patented July 26, 1904.

UNITED STATES PATENT OFFICE.

CARL F. HETTINGER, OF BOSTON, MASSACHUSETTS.

SEPARATOR AND CLEANER.

SPECIFICATION forming part of Letters Patent No. 765,836, dated July 26, 1904.

Application filed March 26, 1904. Serial No. 200,203. (No model.)

*To all whom it may concern:*

Be it known that I, CARL F. HETTINGER, a citizen of the United States, residing at Boston, in the county of Suffolk and State of Massachusetts, have invented a new and useful Separator and Cleaner, of which the following is a specification.

My invention relates to separators for sifting and removing foreign matters from granular substances, and especially from malt and cereals used in the production of beer; and the object of my invention is to provide a simple and efficient means to separate and eject all dust and foreign matter from the material to be treated.

My invention consists of a circular vessel with an inverted conical bottom in which a balanced valve is arranged, a conical sieve or screen supported near the top of the vessel, and a suction-pipe located beneath or near the conical sieve; and my invention further consists of the improvements hereinafter set forth, and pointed out in the claim.

My invention will be more fully understood taken in connection with the accompanying drawings, forming part hereof, in which—

Figure 1:
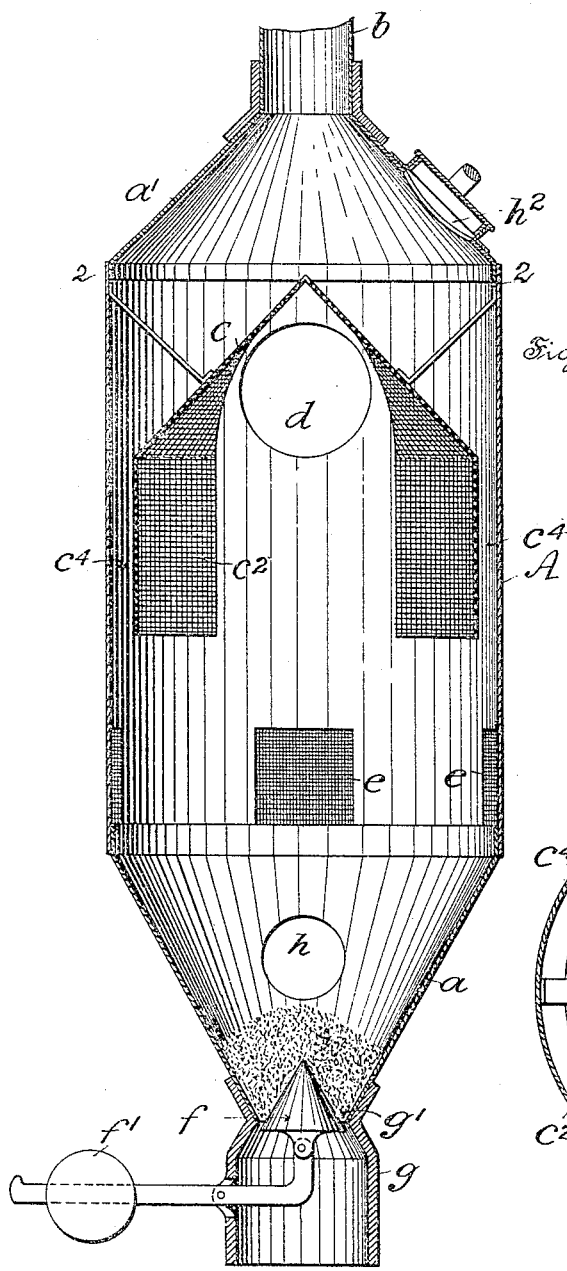
Figure 2:
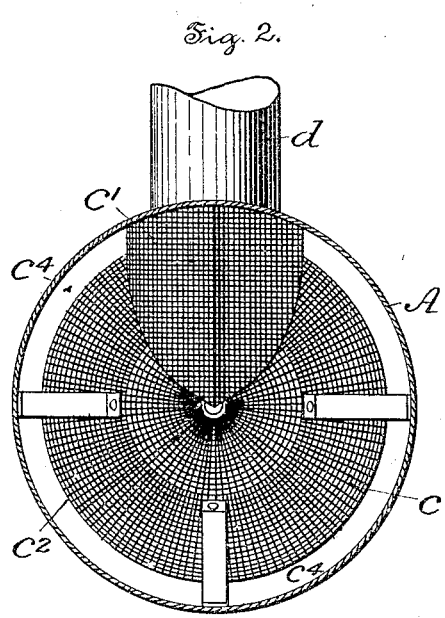

Figure 1 is a vertical section through my improved separator, showing the balanced valve in the conical bottom, the conical sieve supported near the top, and the suction-pipe. Fig. 2 is a transverse section on the line 2 2 of Fig. 1; and Fig. 3 is a sectional view of a malt-house of a brewery, showing the connections of my improved separator and cleaner with the various apparatus and machinery contained in such malt-house.

Referring now to the drawings for a further description of my invention, A is a circular vessel with the inverted conical bottom $a$ and a conical top $a'$. The lower end of the bottom $a$ is provided with a neck $g$, in which a balanced valve $f$ is arranged for a purpose to be presently described. The top $a'$ is provided with an inlet-pipe $b$ and a covered manhole $h^2$. Near the top of the vessel and communicating with the interior thereof is a suction-pipe $d$, and directly over this pipe is located a conical sieve or screen $c$ with a peaked extension $c'$ and a vertical flange $c^2$. This screen is secured to the vessel A by means of stays $c^3$ and is of such proportions to the vessel A as that an annular space $c^4$ is formed between the wall of the vessel and the vertical flange $c^2$. Directly above the bottom $a$ of the vessel A are provided openings $e$ for the admission of air, and these openings are covered with gauze or loosely-woven cloth.

The operation of my improved separator and cleaner is as follows: The material, as malt, barley, rice, &c., is admitted through the inlet-pipe $b$ and drops onto the screen $c$, permitting the dust and small particles of foreign matter to drop through the perforations of the screen, to be immediately taken away by the draft maintained below the screen by the suction-pipe $d$. The material not passing through the screen falls through the annular space $c^4$ and collects on top of the balanced valve $f$, which is so adjusted by the counterweight $f'$ that a predetermined amount of the screened material will pass the throat $g'$ of the neck $g$ and allow a certain amount of the screened material to be supported by the valve for the purpose of permitting the material after leaving the screen to come to a rest, so that any dust which may result from the falling material will be absorbed by the air-draft and passed through the suction-pipe $d$.

The air-passages $e$ are provided to supply sufficient air above the material resting on the valve $f$ and to prevent the screened material from entering the said suction-pipe $d$. A manhole $h$ with cover is also provided in the conical bottom $a$ to allow for cleaning and other purposes.

In Fig. 3 I have shown my separator and cleaner in application to apparatus in a malt-house of a brewery, in which K is a hopper for the reception of malt. $k'$ is a malt-elevator delivering the malt into my improved separator A through the inlet-pipe $b$. B is a rotary fan connected with the suction-pipe $d$ of the separator to cause the extraction of all the dust and foreign matter from the malt and to deliver the same into a receiving-hopper I, provided with a vent-flue $i$, a chute $i'$ with slide $i^2$, and collecting-bag $i^3$. From the separator A the malt passing the balanced valve $f$ is led either into the malt-bin D or into a rotary screen E for further treatment.

Having thus described the nature and objects of my invention, what I claim as new, and desire to secure by Letters Patent, is—

A separator and cleaner comprising a cylindrical vessel, a conical bottom attached thereto a balanced valve in said bottom and within the top of the vessel, a conical screen having a vertical perforated flange pendent from the lower edge of said screen and forming an annular passage between the vessel and said flange, a suction-pipe $d$ communicating with the interior of said screen and said vessel, the latter having rectangular screened air-inlets around its lower portion and a peaked screen extension $c'$ secured to the interior of the vessel near its top and projecting to the center thereof over the suction-pipe, substantially as shown and described.

In witness whereof I have hereunto set my hand in the presence of two subscribing witnesses.

CARL F. HETTINGER.

Witnesses:
   J. M. LUIPPOLD,
   MAX HOHN.